United States Patent
Choi et al.

(10) Patent No.: US 9,547,922 B2
(45) Date of Patent: Jan. 17, 2017

(54) METHOD AND APPARATUS FOR COLOR COMPENSATION IN ELECTRONIC DEVICE

(71) Applicant: Samsung Electronics Co., Ltd., Gyeonggi-do (KR)

(72) Inventors: Jinyoung Choi, Gyeonggi-do (KR); Minjin Kim, Gyeongsangbuk-do (KR); Jangseong Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 16 days.

(21) Appl. No.: 14/601,809

(22) Filed: Jan. 21, 2015

(65) Prior Publication Data
US 2015/0213628 A1 Jul. 30, 2015

(30) Foreign Application Priority Data

Jan. 24, 2014 (KR) .................. 10-2014-0009088

(51) Int. Cl.
*G09G 5/02* (2006.01)
*G06T 11/00* (2006.01)
*H04N 9/64* (2006.01)
*H04N 9/68* (2006.01)

(52) U.S. Cl.
CPC ............. *G06T 11/001* (2013.01); *H04N 9/643* (2013.01); *H04N 9/68* (2013.01)

(58) Field of Classification Search
None
See application file for complete search history.

(56) References Cited

U.S. PATENT DOCUMENTS

| 7,737,992 B2 | 6/2010 | Hong et al. | |
|---|---|---|---|
| 2003/0103234 A1* | 6/2003 | Takabayashi | H04N 1/00132 358/1.15 |
| 2005/0219580 A1* | 10/2005 | Ozawa | H04N 1/60 358/1.9 |
| 2009/0091801 A1* | 4/2009 | Hong | H04N 1/4095 358/464 |
| 2012/0229526 A1* | 9/2012 | Holmes | G06F 3/14 345/690 |

FOREIGN PATENT DOCUMENTS

| KR | 1020050023244 | 3/2005 |
|---|---|---|
| KR | 1020050100314 | 10/2005 |

\* cited by examiner

*Primary Examiner* — Martin Mushambo
(74) *Attorney, Agent, or Firm* — The Farrell Law Firm, P.C.

(57) ABSTRACT

A method and apparatus for color compensation in an electronic device is provided. The method includes determining, in response to a playback request for content, whether to compensate color data of the content according to color compensation information; compensating, when it is determined to compensate the color data of the content according to the color compensation information, the color data of the content according to the color compensation information; and displaying the content of which the color data is compensated.

12 Claims, 7 Drawing Sheets

<a>

<b>

METHOD AND APPARATUS FOR COLOR COMPENSATION IN ELECTRONIC DEVICE

PRIORITY

This application claims priority under 35 U.S.C. §119(a) to a Korean Patent Application filed on Jan. 24, 2014 in the Korean Intellectual Property Office and assigned Serial No. 10-2014-0009088, the entire content of which is incorporated herein by reference.

BACKGROUND

1. Field of the Invention

The present invention generally relates to a method and apparatus for color compensation in an electronic device.

2. Description of the Related Art

Advances in digital technologies have enabled the popularization of various electronic devices supporting communication and personal information processing, such as mobile communication terminals, smartphones, and tablet computers. Such electronic devices may support functions of voice and video call, messaging with Short Message Service (SMS) and Multimedia Message Service (MMS), image capturing, still and moving image playback, music playback, Internet browsing, instant messaging, and Social Networking Services (SNS).

The sense of a color or color vision refers to the ability to perceive and distinguish colors. A color vision deficiency may be referred to as an inability or decreased ability to see and distinguish the three primary colors (i.e. red, green and blue). A person having partial color-blindness or color weakness is less sensitive to color stimuli than a person with a normal color vision and is unable to clearly distinguish similar colors.

For a user with a color vision deficiency, an electronic device may provide a function to separately adjust red, green, and blue colors.

However, when the electronic device is shared by a user with a normal color vision and a user with a color vision deficiency, the users may feel inconvenienced because they have to repeatedly perform color adjustment. In addition, the electronic device may support overall color compensation only for the screen in standard and normal modes, but may fail to support color compensation on a content or application basis.

SUMMARY

The present invention has been made to address at least the above-mentioned problems and/or disadvantages and to provide at least the advantages described below. Accordingly, an aspect of the present invention is to provide a method and apparatus that enable an electronic device to register content supporting color compensation in a server and to play back color-compensated content upon a request.

In accordance with an aspect of the present invention, a method for color compensation in an electronic device is provided. The method includes determining, in response to a playback request for content, whether to compensate color data of the content according to color compensation information; compensating, when it is determined to compensate the color data of the content according to the color compensation information, the color data of the content according to the color compensation information; and displaying the content of which the color data is compensated.

In accordance with another aspect of the present invention, a method for color compensation in an electronic device is provided. The method includes sending, in response to a playback request for content, a content request including color compensation information to a server; receiving the content of which color data is compensated according to the color compensation information from the server; and displaying the content of which the color data is compensated.

In accordance with another aspect of the present invention, an apparatus for color compensation in an electronic device is provided. The apparatus includes a touchscreen; and a control unit configured to determine, in response to a playback request for content, whether to compensate color data of the content according to color compensation information, to compensate, when it is determined to compensate the color data of the content according to the color compensation information, the color data of the content according to the color compensation information, and to control the touchscreen to display the content of which the color data is compensated.

In accordance with another aspect of the present invention, a method for color compensation in a server is provided. The method includes receiving, upon detecting a playback request for content by an electronic device, color compensation information with information of the content from the electronic device; and analyzing the received color compensation information and sending the content of which color data is compensated according to the color compensation information to the electronic device.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1:
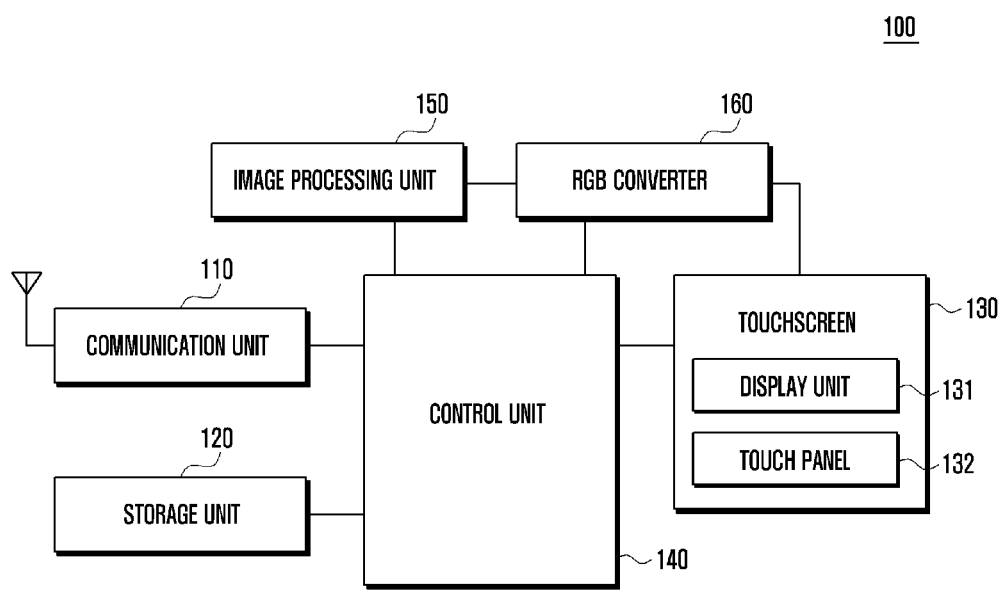
FIG. 1 is a block diagram of a configuration of an electronic device according to an embodiment of the present invention.

Hereinafter, the present invention is described with reference to the accompanying drawings. The following description includes various specific details to assist understanding but these are to be regarded merely as examples.

Accordingly, those of ordinary skill in the art will recognize that various changes and modifications of the embodiments described herein can be made without departing from the scope and spirit of the present invention as defined by the claims and their equivalents. The same reference symbols are used throughout the drawings to refer to the same or like parts.

It will be understood that the terms "comprising", "including", "having", and variants thereof, when used in this description, specify the presence of stated features, steps, operations, elements, and/or components, but do not preclude the presence or addition of one or more other features, steps, operations, elements, components, and/or combinations thereof.

Further, unless expressly stated to the contrary, "or" refers to an inclusive "or" and not to an exclusive "or". For example, a condition A or B may be satisfied by any one of the following: A is true (or present) and B is false (or absent), A is false (or absent) and B is true (or present), and both A and B are true (or present).

Unless defined otherwise, all technical and scientific terms used herein have the same meaning as commonly understood by one of ordinary skill in the art to which the invention belongs. The meaning of specific terms or words used in the specification and the claims should not be limited to the literal or commonly employed sense, but should be construed in accordance with the spirit of the present invention.

The electronic device according to the present invention may be a device having a communication function. For example, the electronic device may be one of a smartphone, a tablet personal computer, a mobile phone, a video phone, an e-book reader, a desktop personal computer, a laptop personal computer, a netbook computer, a personal digital assistant (PDA), a portable multimedia player (PMP), a moving picture experts group audio layer 3 (MP3) player, a mobile medical appliance, a camera, and a wearable device (e.g. electronic eyeglasses, a head-mounted device (HMD), electronic clothing, an electronic bracelet, an electronic necklace, an electronic appcessory, an electronic tattoo, or a smartwatch).

In various embodiments of the present invention, color data refers to colors representing a piece of content. Color compensation information refers to information on adjustment of sensitivity of a color, which is weakly perceived by a user with a color vision deficiency. Color data of content being displayed may be compensated according to the color compensation information so that the user with the color vision deficiency viewing the color-compensated content may have the same color perception as a user with normal color vision viewing the original content.

In various embodiments of the present invention, content stored in an electronic device may be played back, or content stored in a server or obtained through a server may be played back in cooperation with the server through a communication unit. For example, the electronic device may connect to the server and download the content or receive the content transmitted by the server. Specifically, to play back the content stored in the electronic device, the electronic device may load preconfigured color compensation information and play back the content of which the color data is compensated according to the color compensation information. To play back the content stored in the server or obtained through the server, the electronic device may send the color compensation information to the server, receive the content of which the color data is compensated according to the color compensation information from the server, and play back the received content.

FIG. 1 is a block diagram a configuration of an electronic device 100 according to an embodiment of the present invention.

Referring to FIG. 1, the electronic device 100 includes a communication unit 110, a storage unit 120, a touchscreen 130, a control unit 140, an image processing unit 150, and a Red Green Blue (RGB) converter 160.

The communication unit 110 performs voice, video or data communication with an external device through a network. The communication unit 110 may include a radio frequency transmitter for upconverting the frequency of a signal to be transmitted and amplifying the signal, and a radio frequency receiver for low-noise amplifying a received signal and downconverting the frequency of the received signal. The communication unit 110 may perform modulation and demodulation in accordance with Code Division Multiple Access (CDMA), Wideband CDMA (WCDMA), LTE (Long Term Evolution), Wi-Fi, Wireless Broadband (WiBro), Bluetooth and Near Field Communication (NFC). The communication unit 110 may include a mobile communication module, an Internet communication module, and/or a short-range communication module.

In particular, the communication unit 110 sends color compensation information stored in the electronic device 100 to a server in response to a content playback request under control of the control unit 140. The communication unit 110 receives the content of which the color data is compensated according to the color compensation information from the server under control of the control unit 140.

The storage unit 120 may include a program area to store executable programs of the electronic device 100, and a data area to store data generated during a program execution.

The touchscreen 130 includes a display unit 131 and a touch panel 132 as a single entity. The display unit 131 displays various screens in the course of operating the electronic device 100 under control of the control unit 140. The display unit 131 may be realized using liquid crystal display (LCD) elements, organic light-emitting diodes (OLED), active-matrix organic light-emitting diodes (AMOLED), a flexible display, a bended display, and a three dimensional display. The display unit 131 may be configured to be flexible, transparent or wearable. The touch panel 132 may be a composite touch panel including a hand touch panel to sense hand gestures and a pen touch panel to sense pen gestures.

In particular, the display unit 131 displays the content of which the color data is compensated according to the color compensation information under control of the control unit 140.

The control unit 140 controls the overall operation of the electronic device 100, controls signal exchange between internal components thereof, performs data processing, and controls a supply of power from a battery to the internal components.

In particular, the control unit 140 adjusts sensitivity of specific colors to configure the color compensation information. To play back the content through the server connected through the communication unit 110 with the electronic device 100, the control unit 140 sends the color compensation information to the server. The control unit 140 receives the content of which the color data is compensated according to the color compensation information from the server and controls the display unit 131 to display the compensated content. To play back the content stored in the electronic device 100, the control unit 140 loads the preconfigured color compensation information and controls the display unit 131 to display the content of which the color data is compensated according to the color compensation information.

The image processing unit 150 is configured to process the content stored in the electronic device 100 or received through the communication unit 110 to be displayed. The image processing unit 150 may include a video codec, a stereo video codec, an image codec, a stereo image codec, a graphics library, a 3D graphics library, and a stereo graphics library. The image processing unit 150 performs processing for outputting video data contained in a still image, a moving image, and a game, and for outputting video data contained in a 3D still image, a 3D moving image, a 3D game, and a 3D augmented reality (AR). When an input signal corresponding to a content playback request is received, the image processing unit 150 forwards the input signal to the RGB converter 160.

The RGB converter 160 receives decoded image data and converts the format of the decoded image data into an RGB format.

In particular, the RGB converter 160 compensates the color data of the content received from the image processing unit 150 according to the color compensation information. The RGB converter 160 outputs the content of which the color data is compensated according to the color compensation information to the display unit 131.

The electronic device 100 may further include supplementary components, such as a Global Positioning System (GPS) receiver to receive position information, a camera module to capture still and moving images, an audio processing unit including a microphone and a speaker, a broadcast reception module to receive broadcasts, an input unit supporting a hard key based input. Such additional components will not be described or shown in further detail.

Figure 2:
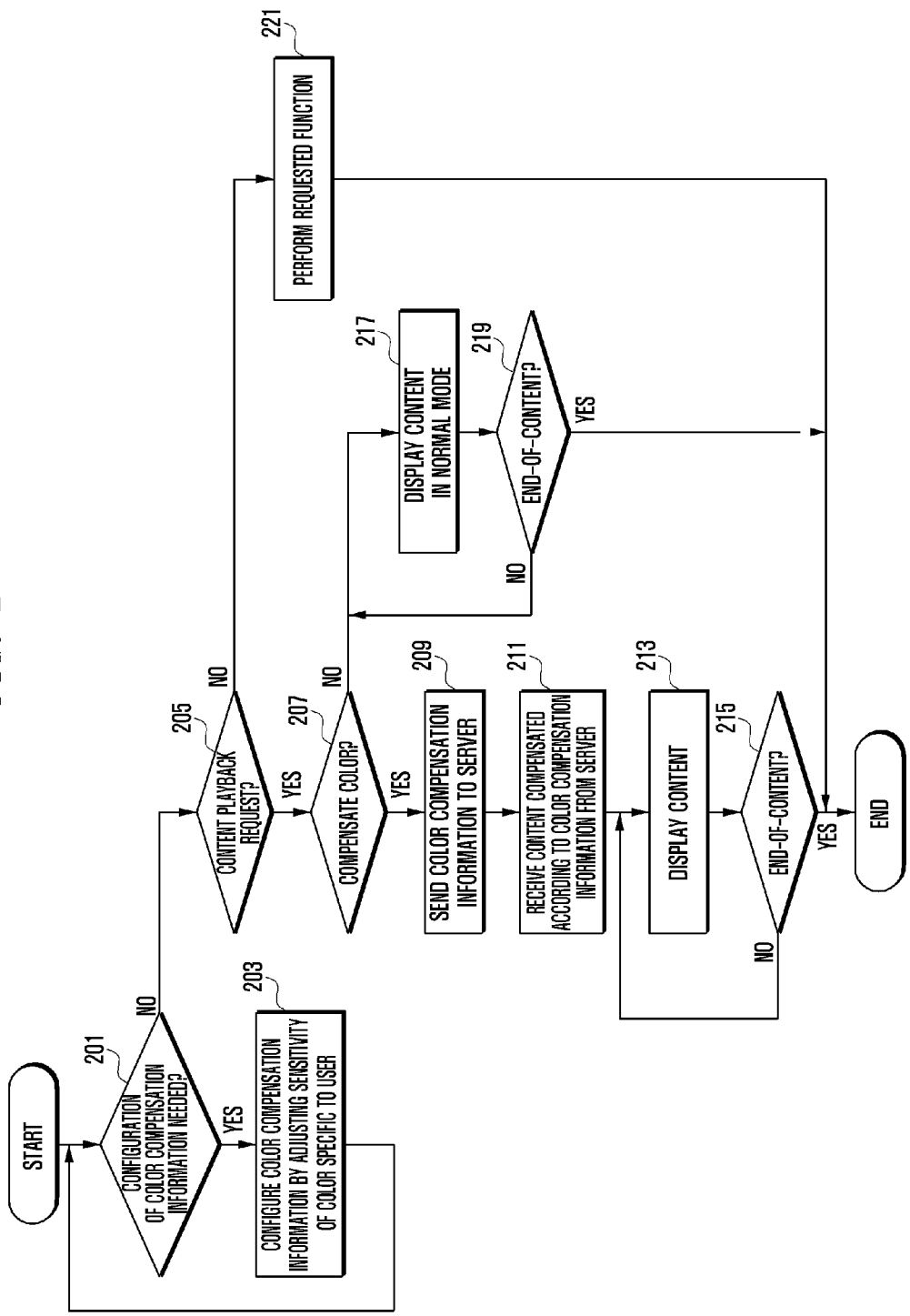
FIG. 2 is a flowchart of a method for color compensation during playback of content in cooperation with a server according to an embodiment of the present invention.

FIG. 2 is a flowchart of a method for color compensation during playback of content in cooperation with a server according to an embodiment of the present invention.

Referring to FIGS. 1 and 2, when content stored in a server or obtained through a server is played back in cooperation with the server through the communication unit 110, the content is compensated according to color compensation information. For playback of the content (e.g. the content is downloaded from the server), the electronic device 100 may send preconfigured color compensation information to the server and receive the content of which the color data is compensated according to the color compensation information from the server.

Specifically, at step 201, the control unit 140 of the electronic device 100 checks whether a configuration of color compensation information is needed. If it is determined that the configuration of the color compensation information is needed, at step 203, the control unit 140 configures color compensation information by adjusting sensitivity of a color that is specific to the user. The user may have a weak perception of at least one of red, green, and blue colors. Specifically, when it is determined that the configuration of the color compensation information is needed, the color compensation application may be executed. The color compensation information may be configured according to an execution of a color compensation application. The control unit 140 may configure the color compensation information for the user by adjusting sensitivity (e.g. contrast, gamma and brightness) of a specific color. Here, steps 201 and 203 may be a preparation for playback of the content to be performed at subsequent steps.

If it is determined that the configuration of the color compensation information is not needed, at step 205, the control unit 140 determines whether a content playback request is issued. A content playback request may be issued by an execution of an application related to a photograph, a moving image, a document, an electronic book, Internet browsing, or a map. If it is determined that the content playback request is not issued, at step 221, the control unit 140 performs a requested function. If it is determined that the content playback request is issued, at step 207, the control unit 140 determines whether to compensate the color data of the content according to the color compensation information. In an embodiment of the present invention, whether to perform color compensation may be determined whenever a content playback request is issued. That is, whenever there is a content playback request, in response to the content playback request, the control unit 140 determines whether to compensate the color data. In an embodiment of the present invention, a piece of content may be selectively displayed with or without color compensation. That is, not all pieces of content are color compensated to be displayed on the display unit 131, but only the content selected by the user is color compensated according to the color compensation information.

Upon determining to compensate the color data of the content at step 207, at step 209, the control unit 140 sends the color compensation information to the server. The color compensation information may be sent in a content request. At step 211, the control unit 140 receives the content of which the color data is compensated according to the color compensation information from the server. At step 213, the control unit 140 controls the display unit 131 to display the compensated content. At step 215, the control unit 140 checks whether an end-of-content indication is detected. If an end-of-content indication is detected, the control unit 140 terminates playback of the content. If an end-of-content indication is not detected, the control unit 140 returns to step 213 and continues to display the content of which the color data is compensated.

Upon determining not to compensate the color data of the content at step 207, the control unit 140 sends a content request at step 217, the control unit 140 sends a content request, receive the content from the server, and controls the display unit 131 to display the content in a normal mode. In the normal mode, the color compensation is not performed, and the content is displayed using default colors of the electronic device 100. At step 219, the control unit 140 checks whether an end-of-content indication is detected. If an end-of-content indication is detected, the control unit 140 terminates playback of the content in the normal mode. If an end-of-content indication is not detected, the control unit 140 returns to step 217 and continues to display the content in normal mode.

Figure 3:
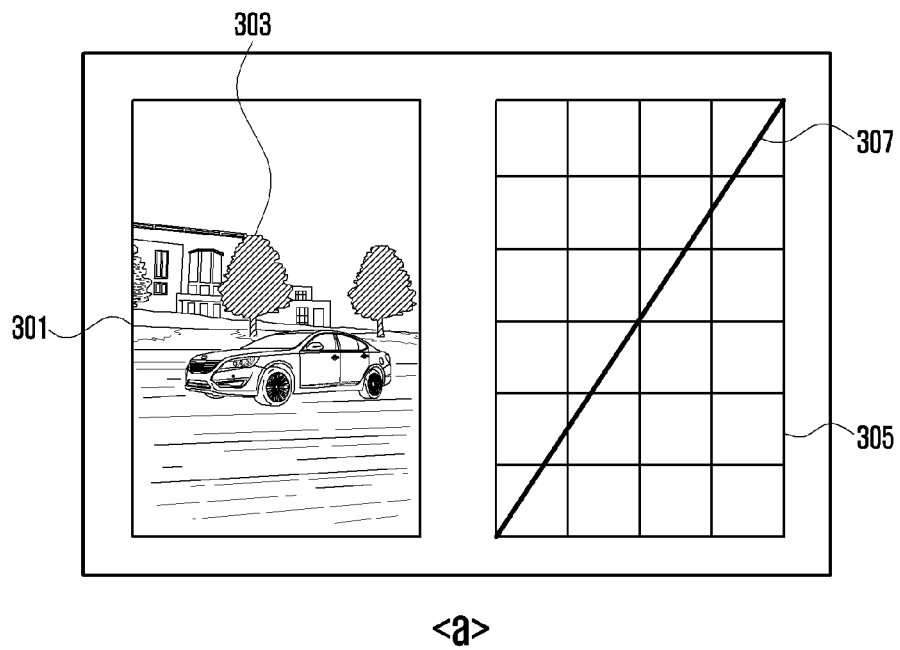
FIG. 3 illustrates a configuration of color compensation information according to an embodiment of the present invention.
Figure 3:
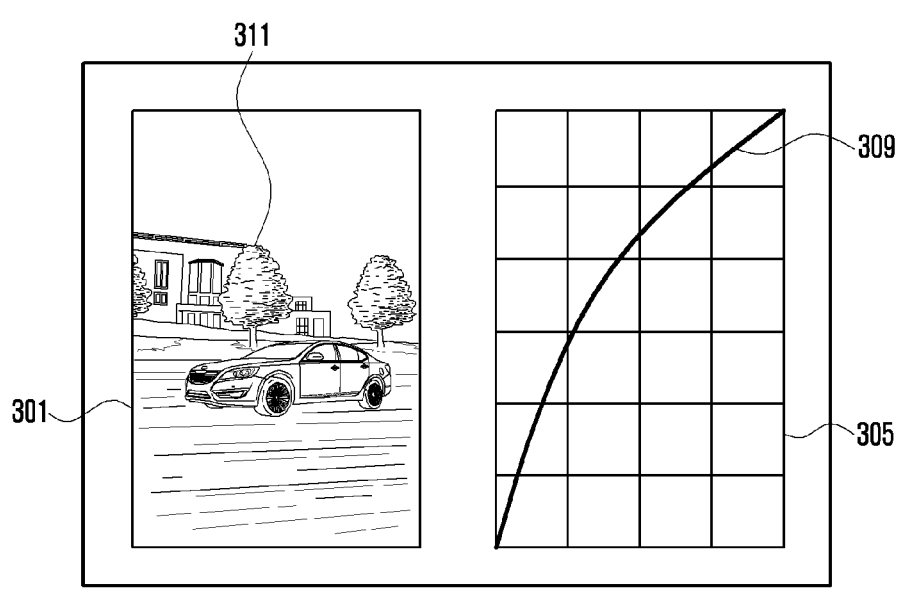

FIG. 3 illustrates a configuration of color compensation information according to an embodiment of the present invention.

In FIG. 3(*a*), the color of an object indicated by numerical reference 303 in a content region 301 is not clearly visible to the user. It is assumed that a hatched region in the content region 301 indicates a region of an object of which the color is not clearly perceived by the user (i.e. adjustment of color sensitivity is needed) in the drawing shown in the content region 301. To adjust the color that is weakly perceived by the user, the color curve indicated by item 307 in the sensitivity setting region 305 of FIG. 3(*a*) is changed to the color curve indicated by numerical reference 309 in the sensitivity setting region 305 of FIG. 3(*b*). With the change of the color curve, the color of the object is compensated as indicated by item 311. Thereby, the user with color vision deficiency may have the same color perception as a user with normal color vision. For example, for a user with reduced sensitivity to green, the color compensation information indicating an increase in sensitivity to green may be stored. While the content compensated according to the color compensation information increasing sensitivity to green may appear too green to a person with a normal color vision, it may be perceived by the user with reduced sensitivity to green to be the same as the original content perceived by the person with the normal color vision before adjustment.

Figure 4:
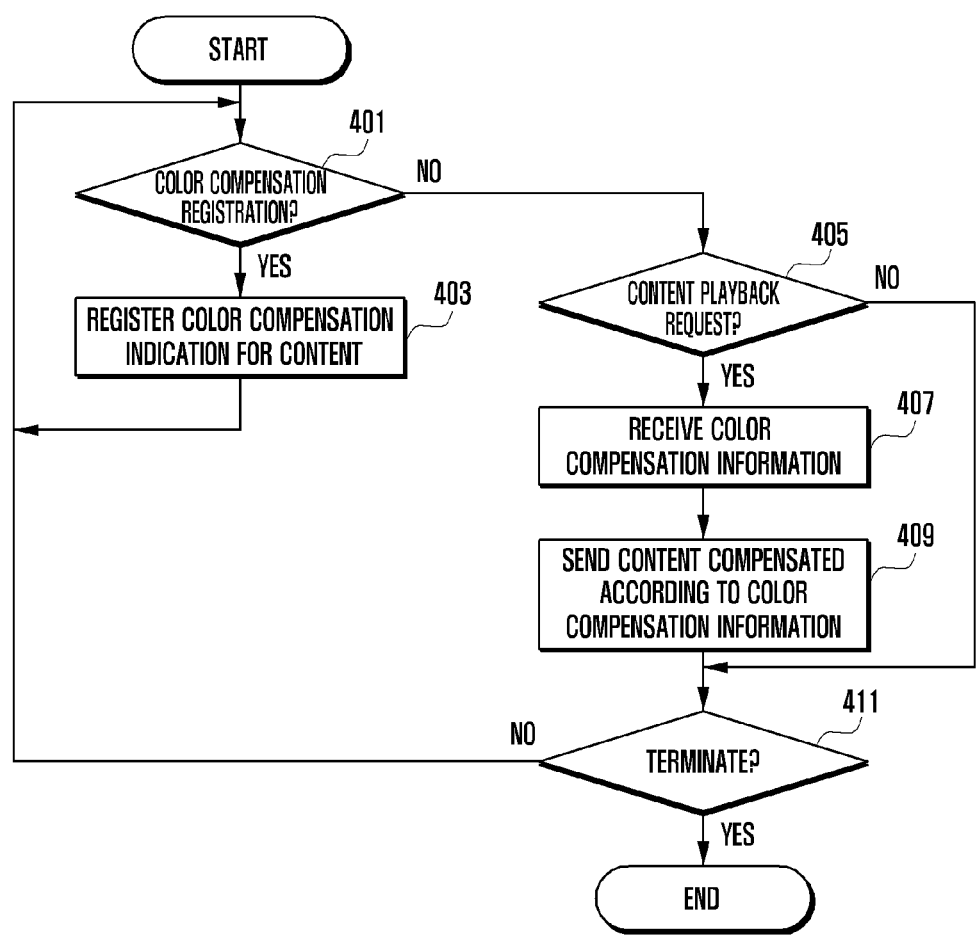
FIG. 4 is a flowchart of a procedure performed by the server to transfer color-compensated content according to an embodiment of the present invention.

FIG. 4 is a flowchart of a procedure performed by the server to transfer color-compensated content according to an embodiment of the present invention.

Referring to FIGS. 1 and 4, at step 401, the server determines whether a registration request for color compensation is issued for specific content. If it is determined that a registration request for color compensation is issued, at step 403, the server registers a color compensation indication for the content. In an embodiment of the present invention, a color compensation indication may be registered for specific content by adding a "color Blindness" entry to metadata of the specific content as shown in Table 1. That is, the "color Blindness" entry is set to 'y' in the metadata of the specific content, making the color of the specific content correctable.

version without color compensation, a version with red color compensation, a version with green color compensation, a version with blue color compensation, and a version with at least two colors compensated (e.g. red/green). The electronic device 100 displays the compensated content (i.e., playback of the content). The playback of the content may involve downloading or streaming from the server. At step 411, the server determines whether a stop command is issued. If it is determined that a stop command is issued, the server ends the procedure. If it is determined that a stop command is not issued, the server returns to step 401.

Figure 5:
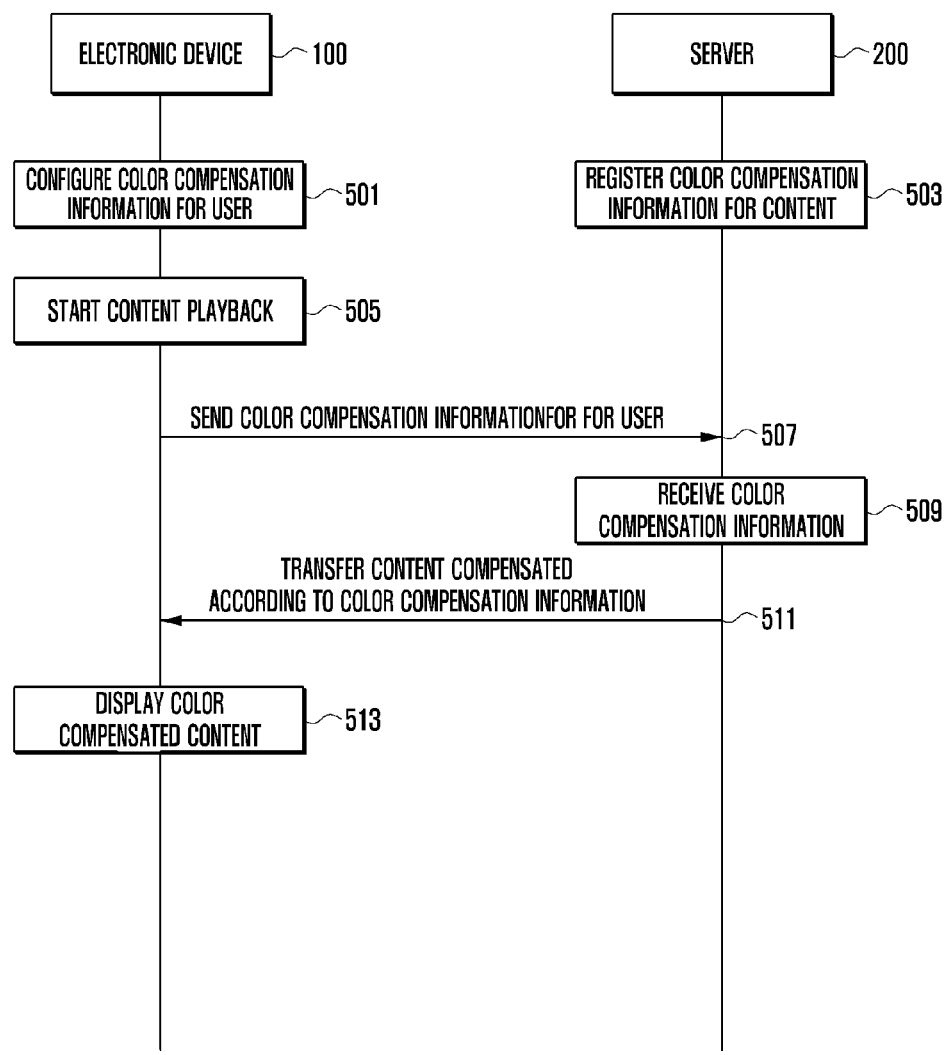
FIG. 5 is a sequence diagram illustrating signal flows between the electronic device and the server for color compensation control according to an embodiment of the present invention.

FIG. 5 is a sequence diagram illustrating signal flows between the electronic device 100 and the server 200 for color compensation control according to an embodiment of the present invention.

Referring to FIG. 5, at step 501, the electronic device 100 executes a color compensation application to configure color compensation information for the user. At step 503, the server 200 registers specific content as color correctable content by adding a color compensation entry to metadata of the content. The server 200 may prepare multiple versions of the content by compensating the color data of the content according to all color compensation information. At step 505, the electronic device 100 starts playback of the content. At step 507, the electronic device 100 sends the configured color compensation information to the server 200. The color compensation information may be sent with information of

TABLE 1

```
<contentAttributeList>
                                                <!-- Default Attributes - Please input
metadata -->                                    <entry key="Episode
Title ">Pilot</entry>                           <!-- Mandatory -->
<entry key="Synopsis">A new high school is the perfect place for will Mackenzie
to start fresh Jay, Neil and Simon get
..
...
....                                            <entry
keys"AUDIO_LANGUAGE">EN</entry>                 <!-- Language code :
ISO 639-1-->
<entry keys="Release Date">2011-08-24</entry>
<entry keys="CAPTION_LANGUAGE">EN</entry>       <!--
Language code : ISO 639-1-->
<entry key="Episode number">17</entry>
<entry key="Season number">1</entry>
<entry key="color Blindness">y</entry>
<entry key="heating impairment">y</entry>
....
```

When the specific content is registered as color correctable content, the server may prepare multiple versions of the specific content by compensating the color data of the specific content in various ways.

If it is determined that a registration request for color compensation is not issued, at step 405, the server determines whether a playback request for content is received from the electronic device 100. If it is determined that a playback request is received, at step 407, the server receives color compensation information from the electronic device 100. Upon reception of the color compensation information, at step 409, the server analyzes the color compensation information and sends the content of which the color data is compensated according to the color compensation information to the electronic device 100. Specifically, in response to the reception of the color compensation information from the electronic device 100, the server may send a compensated version of the content corresponding to the received color compensation information. For example, the server may maintain multiple versions of the content, such as a the content (e.g., a content request for the content). At step 509, the server 200 receives the color compensation information. The color compensation information may be received with information of the content (e.g., a content request for the content). At step 511, the server 200 transfers the content of which the color data is compensated according to the color compensation information to the electronic device 100. At step 513, the electronic device 100 receives the content of which the color data is compensated from the server and displays the received content.

Figure 6:
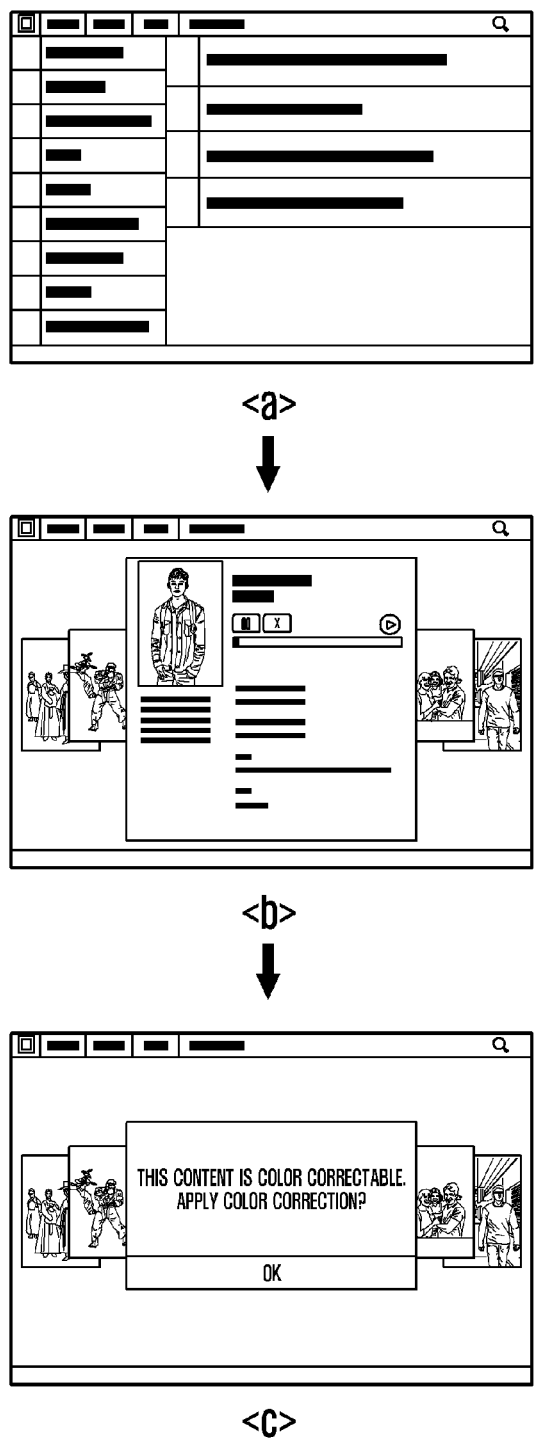
FIG. 6 illustrates color compensation during playback of content in cooperation with the server according to an embodiment of the present invention.

FIG. 6 illustrates color compensation during playback of content in cooperation with the server according to an embodiment of the present invention.

Referring FIGS. 1, 5 and 6, the color data of specific content, which can be downloaded from the server 200 connected through the communication unit 110 with the electronic device 100 for playback, may be compensated.

When a screen is displayed with content as shown in FIG. 6(*a*), at least one piece of the content to be downloaded is selected as shown in FIG. 6(*b*). Upon a selection of the content to be downloaded, a popup window requesting the user to determine whether to apply color compensation to the selected content is displayed as shown in FIG. 6(c). According to the determination result, a color compensated version or original version of the selected content may be downloaded to the electronic device 100 for playback.

Figure 7:
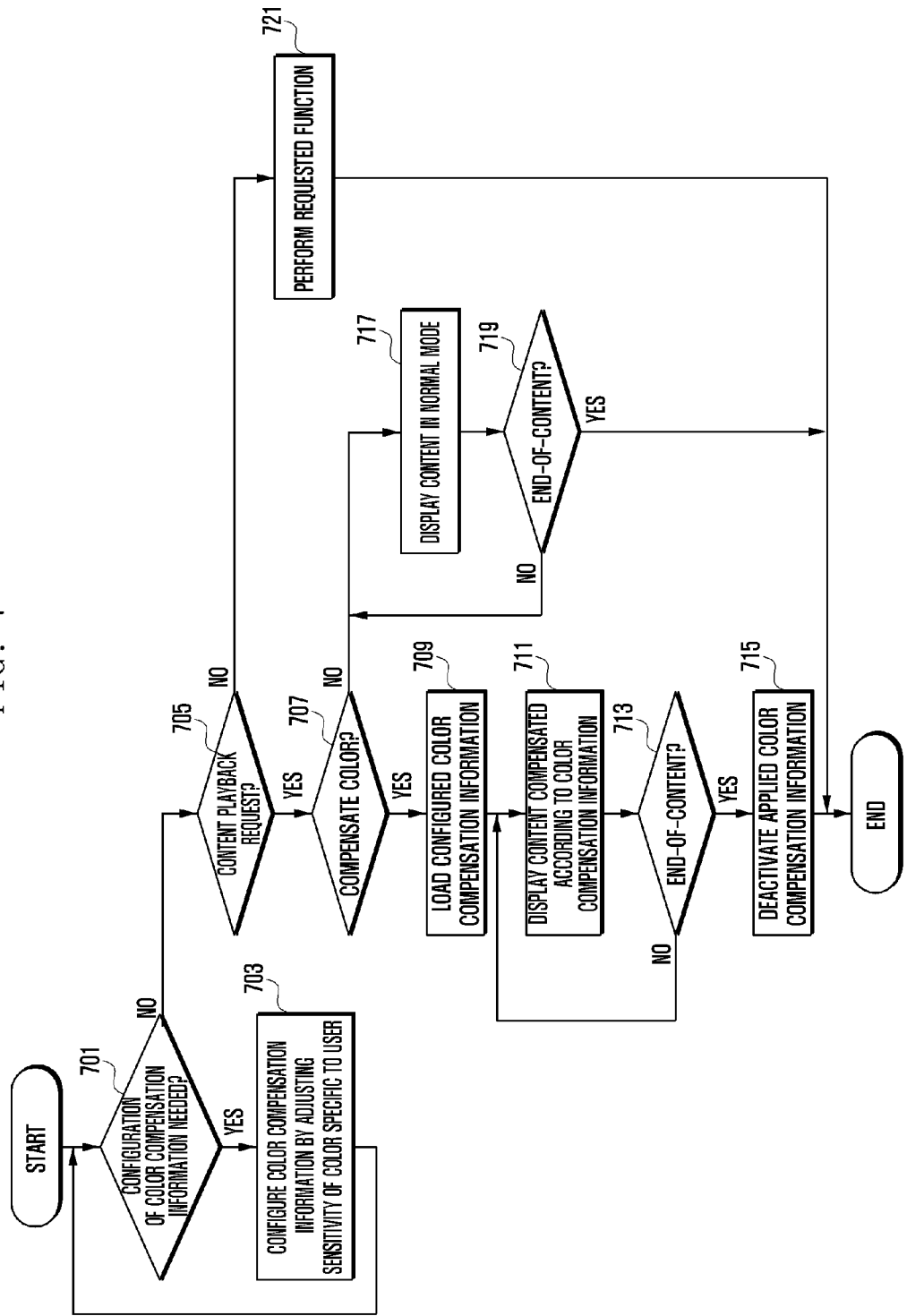
FIG. 7 is a flowchart of a method for color compensation during playback of content stored in the electronic device according to an embodiment of the present invention.

FIG. 7 is a flowchart of a method for color compensation during playback of content stored in the electronic device according to an embodiment of the present invention.

Referring to FIGS. 1 and 7, a piece of content stored in the electronic device is color compensated for playback. In response to a playback request, the electronic device 100 may load preconfigured color compensation information, compensate the color data of the content according to the preconfigured color compensation information, and display the compensated content.

Specifically, at step 701, the control unit 140 of the electronic device 100 checks whether a configuration of color compensation information is needed. If it is determined that the configuration of the color compensation information is needed, at step 703, the control unit 140 configures color compensation information by adjusting sensitivity of a color that is specific to the user. The user may have a weak perception of at least one of red, green, and blue colors. Specifically, when it is determined that the configuration of the color compensation information is needed, the color compensation application may be executed. The color compensation information may be configured according to an execution of a color compensation application. The control unit 140 may configure the color compensation information for the user by adjusting sensitivity (e.g. contrast, gamma and brightness) of a specific color. Here, steps 701 and 703 may be a preparation for playback of the content to be performed at subsequent steps.

If it is determined that the configuration of the color compensation information is not needed, at step 705, the control unit 140 determines whether a content playback request is issued. A content playback request may be issued by an execution of an application dealing with a photograph, a moving image, a document, an electronic book, Internet browsing, or a map. If it is determined that the content playback request is not issued, at step 721, the control unit 140 performs a requested function. If it is determined that the content playback request is issued, at step 707, the control unit 140 determines whether to apply color compensation. In an embodiment of the present invention, whether to apply color compensation may be determined whenever a content playback request is issued. In an embodiment of the present invention, a piece of content may be selectively displayed with or without color compensation. That is, not all pieces of the content are color compensated to be displayed on the display unit 131, but only the content selected by the user is color compensated to be displayed.

Upon determining to apply color compensation at step 707, at step 709, the control unit 140 loads the color compensation information, which is preconfigured or configured at step 703. At step 711, the control unit 140 controls the display unit 131 to display the content of which the color data is compensated according to the color compensation information. At step 713, the control unit 140 determines whether an end-of-content indication is detected. If it is determined that the end-of-content indication is detected, at step 715, the control unit 140 deactivates the color compensation information and terminates playback of the content. Here, although the color compensation information applied to the content is deactivated, when the content is played back again, whether to apply color compensation may be re-determined. If it is determined that the end-of-content indication is not detected, the control unit 140 returns to step 711 and continues to display the color compensated content.

Upon determining not to apply color compensation at step 707, at step 717, the control unit 140 controls the display unit 131 to display the content in a normal mode. In the normal mode, color compensation is not applied, and the content is displayed using default colors of the electronic device 100. At step 719, the control unit 140 determines whether an end-of-content indication is detected. If it is determined that the end-of-content indication is detected, the control unit 140 terminates playback of the content in the normal mode. If it is determined that the end-of-content indication is not detected, the control unit 140 returns to step 717 and continues to display the content in the normal mode.

In an embodiment of the present invention, the electronic device may provide color-compensated content to a user with a color vision deficiency so that the user may have color perception similarly to a person with a normal color vision.

Hereinabove, various embodiments of the present invention has been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

What is claimed is:

1. A method for color compensation in an electronic device, the method comprising:
    determining, in response to a playback request for content, whether to compensate color data of the content based on color compensation information;
    compensating, when it is determined to compensate the color data of the content based on the color compensation information, the color data of the content based on the color compensation information; and
    displaying the content of which the color data is compensated,
    wherein displaying the content of which the color data is compensated further comprises deactivating the color compensation information applied to the color data when an end-of-content indication is detected.

2. The method of claim 1, further comprising configuring the color compensation information,
    wherein configuring the color compensation information comprises:
    displaying a compensation screen;
    changing a color curve in the compensation screen according to an input value; and
    storing the color compensation information corresponding to the changed color curve.

3. The method of claim 2, wherein the color compensation information is related to adjustment of contrast, gamma, and brightness values for at least one of red, green, and blue colors.

4. A method for color compensation in an electronic device, the method comprising:
    sending, in response to a playback request for content, a content request including color compensation information to a server;
    receiving the content of which color data is compensated based on the color compensation information from the server; and
    displaying the content of which the color data is compensated, wherein displaying the content of which the color data is compensated further comprises determining deactivation of the color compensation information applied to the color data when an end-of-content indication is detected.

5. The method of claim 4, further comprising sending, when it is determined not to compensate the color data of the content according to the color compensation information, a content request to the server, and displaying the content received from the server in a normal mode.

6. An apparatus for color compensation in an electronic device, the apparatus comprising:
   a touchscreen configured to display content compensated according to color compensation information; and
   a control unit configured to determine, in response to a playback request for the content, whether to compensate color data of the content according to the color compensation information, to compensate, when it is determined to compensate the color data of the content according to the color compensation information, the color data of the content according to the color compensation information, and to control the touchscreen to display the content of which the color data is compensated,
   wherein the control unit is further configured to deactivate the color compensation information applied to the color data when the end-of-content indication is detected.

7. The apparatus of claim 6, wherein the control unit is further configured to configure the color compensation information by controlling the touchscreen to display a compensation screen, changing a color curve in the compensation screen according to an input value, and storing the color compensation information corresponding to the changed color curve.

8. The apparatus of claim 7, wherein the control unit is further configured to adjust contrast, gamma, and brightness values for at least one of red, green, and blue colors to configure the color compensation information.

9. The apparatus of claim 6, wherein, in response to the playback request for the content, the control unit is further configured to send a content request including the color compensation information to a server, to receive the content of which the color data is compensated according to the color compensation information from the server, and to control the touchscreen to display the content of which the color data is compensated.

10. The apparatus of claim 9, wherein, when it is determined not to compensate the color data of the content according to the color compensation information, the control unit is further configured to control the touchscreen to display the content in a normal mode.

11. A method for color compensation in a server, the method comprising:
   receiving, upon detecting a playback request for content by an electronic device, color compensation information with information of the content from the electronic device;
   compensating the color data of the content based on the received color compensation information and sending the content of which color data is compensated to the electronic device, and
   deactivating the color compensation information applied to the color data when an end-of-content indication is detected.

12. The method of claim 11, further comprising registering the color compensation information for the color data of the content.

* * * * *